(12) United States Patent
Chittella et al.

(10) Patent No.: US 11,089,373 B2
(45) Date of Patent: Aug. 10, 2021

(54) SEEK WITH THUMBNAIL GENERATION AND DISPLAY DURING PLACESHIFTING SESSION

(71) Applicant: SLING MEDIA PVT LTD, Bangalore (IN)

(72) Inventors: Kiran Chittella, Bangalore (IN); Bharani Gopinath, Bangalore (IN); Rueju Namath, Bangalore (IN); Jayaprakash Ramaraj, Bangalore (IN); Arunoday Thammineni, Bangalore (IN); Varunkumar Tripathi, Bangalore (IN)

(73) Assignee: Sling Media PVT LTD, Bangalore (IN)

( * ) Notice: Subject to any disclaimer, the term of this patent is extended or adjusted under 35 U.S.C. 154(b) by 0 days.

(21) Appl. No.: 15/859,284

(22) Filed: Dec. 29, 2017

(65) Prior Publication Data

US 2018/0255362 A1 Sep. 6, 2018

(51) Int. Cl.
*H04N 21/472* (2011.01)
*H04N 21/2387* (2011.01)
*H04N 5/783* (2006.01)
*H04N 21/6587* (2011.01)
*H04N 21/2187* (2011.01)
*H04N 21/2343* (2011.01)

(52) U.S. Cl.
CPC ....... *H04N 21/47217* (2013.01); *H04N 5/783* (2013.01); *H04N 21/2187* (2013.01); *H04N 21/2387* (2013.01); *H04N 21/234363* (2013.01); *H04N 21/47202* (2013.01); *H04N 21/6587* (2013.01); *H04N 2201/325* (2013.01)

(58) Field of Classification Search
CPC ............ H04N 21/262; H04N 21/2625; H04N 21/2187; H04N 21/47217; H04N 5/783; H04N 21/234363; H04N 21/2387
USPC .................................................. 725/88, 102
See application file for complete search history.

(56) References Cited

U.S. PATENT DOCUMENTS

| 7,707,614 | B2 | 4/2010 | Krikorian et al. |
| 8,401,681 | B2 | 3/2013 | Rosenblatt et al. |
| 9,426,440 | B2 | 8/2016 | Kim et al. |
| 9,674,257 | B2* | 6/2017 | Eyler .................... H04L 65/602 |
| 10,075,481 | B2 | 9/2018 | Shankarraman |
| 10,171,534 | B2 | 1/2019 | Major et al. |

(Continued)

*Primary Examiner* — Jefferey F Harold
*Assistant Examiner* — Franklin S Andramuno
(74) *Attorney, Agent, or Firm* — Lorenz & Kopf L.L.C.

(57) ABSTRACT

Seek and other trick play functions can be improved in placeshifting and similarly live-encoded video streams. Thumbnail images are derived from I-frames (or similar key frames) of the source video stream rather than from the live-encoded stream. The thumbnail images are tagged to indicate a presentation time stamp (PTS) or similar identification of the source video frame that was used to create the thumbnail image. The tagged thumbnails are provided to the media player, which renders the images to indicate different portions of the video stream as the viewer scans or performs other functions. When the viewer selects to skip to a different part of the video stream, the PTS or similar identifier associated with the presented thumbnail image is sent to the placeshifting encoder to identify the appropriate starting point to resume live encoding.

11 Claims, 3 Drawing Sheets

(56) References Cited

U.S. PATENT DOCUMENTS

Figure 1:
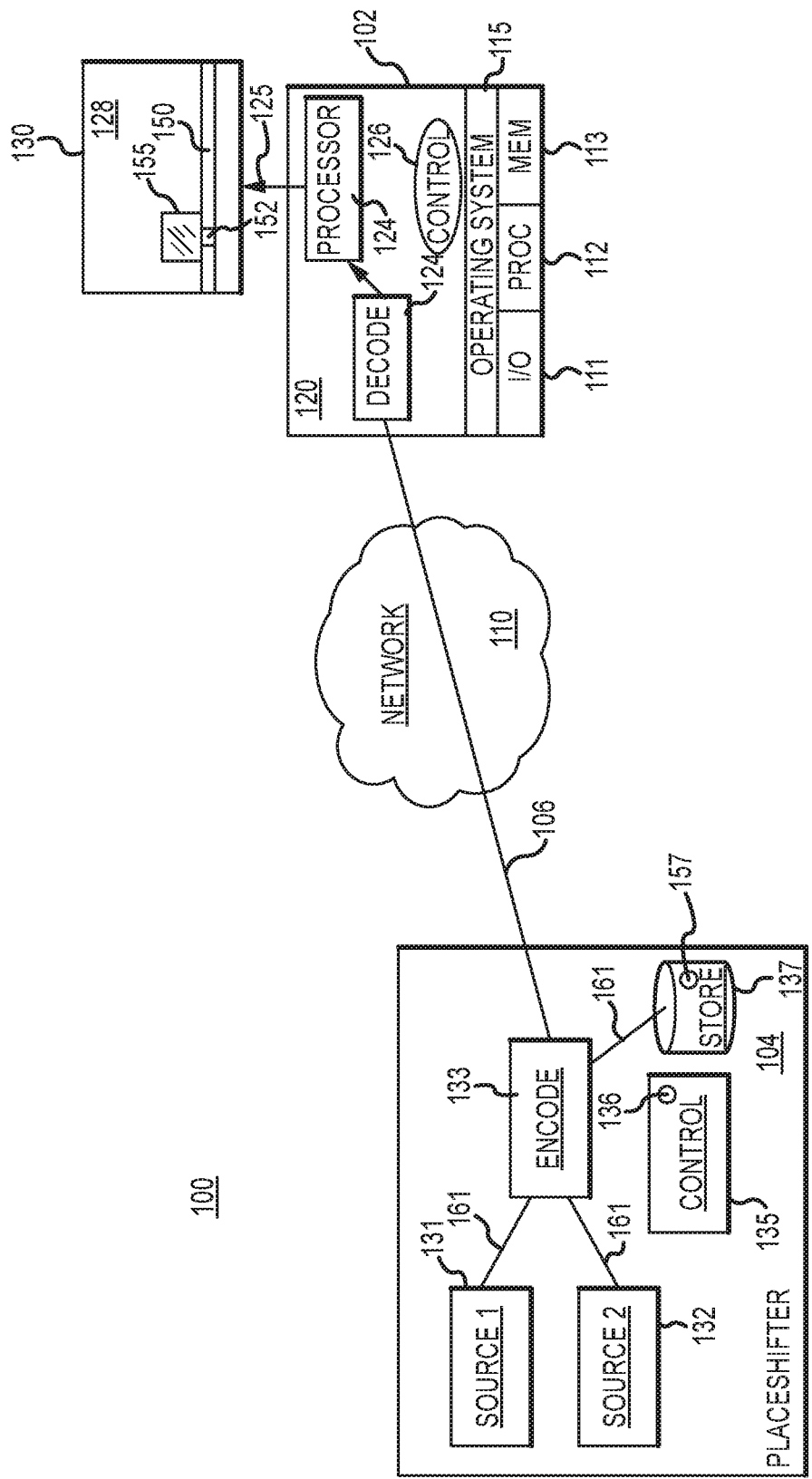

| | | | |
|---|---|---|---|
| 2005/0071886 A1* | 3/2005 | Deshpande | H04N 21/47202 725/135 |
| 2005/0183120 A1* | 8/2005 | Jain | H04N 7/17336 725/46 |
| 2011/0035669 A1 | 2/2011 | Shirali et al. | |
| 2011/0055864 A1 | 3/2011 | Shah et al. | |
| 2012/0222071 A1* | 8/2012 | Gaede | H04N 5/765 725/38 |
| 2013/0251274 A1* | 9/2013 | Xie | G06K 9/00751 382/218 |
| 2014/0118625 A1* | 5/2014 | Cho | H04N 5/44513 348/734 |
| 2014/0281006 A1* | 9/2014 | Major | H04L 65/60 709/231 |
| 2015/0281329 A1 | 10/2015 | Dimov | |
| 2016/0314819 A1* | 10/2016 | Elsner | G11B 27/34 |
| 2017/0109008 A1* | 4/2017 | Darby | G06F 3/03545 |

* cited by examiner

SEEK WITH THUMBNAIL GENERATION AND DISPLAY DURING PLACESHIFTING SESSION

PRIORITY CLAIM

This application claims priority to India Provisional Application Serial No. 201641044806 filed on Dec. 29, 2016. That application is incorporated herein by reference.

TECHNICAL FIELD

The following discussion generally relates to placeshifting of media content over digital networks. More particularly, the following discussion relates to systems, devices and processes to improve seeking in a placeshifted media stream.

BACKGROUND

"Placeshifting" refers to shifting the viewing location of television or other media content from one place (e.g., a home television) to another. Many commercially-available placeshifting devices and systems now allow viewers to placeshift content from their home televisions, television receivers, set top boxes (STBs), digital video recorders (DVRs) and/or the like to any other locations where network access can be obtained. Media content can be "placeshifted", for example, by providing a streaming media connection from the placeshifting device to a mobile phone, portable computer and/or other media player that may be located in a different room, building or other remote place that is nevertheless accessible via a local area and/or wide area network. Typically, the media player controls the remotely-located media source to select programming, change channels, fast forward/rewind scans, and so forth.

Many users also view pre-recorded media content from various media streaming sites, including any number of different video-on-demand services, as well as web-based systems such as YOUTUBE.COM or the like. With recent advances in wireless and other mobile bandwidth, it is possible for viewers to watch streaming video on any number of different devices, including mobile phones, tablets and the like. With conventional video streaming, the media content is processed and pre-stored with a content delivery network (CDN) or other video server at a time that is well ahead of delivery and playback. Typically, the content is pre-encoded into a convenient streaming format, and the complete video program (along with any relevant metadata about the content) is stored with the server before any streaming even begins. The CDN/server simply needs to deliver the pre-formatted content in this case; there is no need to adapt the content on the fly or to perform other adaptations during streaming.

When the user is viewing a conventional streaming video, then, it can be relatively straightforward to skip ahead or back in the video stream. This is because the entire stream has already been encoded, so the media player simply needs to fetch the encoded content at the requested point in the video. Moreover, because video streaming content from conventional CDN services (e.g. YouTube, Netflix etc.) emanates from previously-stored video, such services can often provide enhanced "seek" experience during streaming by previewing thumbnails derived from that stored video.

For placeshifting and other live encoding situations, however, trick play and other types of scanning can be considerably more difficult. Generally speaking, it is desired that users have the same experiences with placeshifted content that they would have with other media viewing experiences (e.g., watching television at home, or viewing a VOD stream). In practice, however, this is difficult to achieve. The realities of video encoding, network communications and other factors can often make basic functions much more difficult in the live encoding setting. Skipping ahead or behind, for example, can be substantially more difficult when the program stream is being encoded in real time (or near real time) while the program is being delivered to the client device. In particular, seeking to thumbnail images is generally not possible during live encoding at least in part because future imagery has yet to be received.

It is therefore desirable to create systems and methods that are able to improve seeking within a placeshifted media stream. Other desirable features and characteristics will become apparent from the subsequent detailed description and the appended claims, taken in conjunction with the accompanying drawings and this background section.

BRIEF SUMMARY

Seek and other trick play functions can be improved in placeshifting and similarly live-encoded video streams. Thumbnail images are derived from I-frames (or similar key frames) of the source video stream rather than from the live-encoded stream. The thumbnail images are tagged to indicate a presentation time stamp (PTS) or similar identification of the source video frame that was used to create the thumbnail image. The tagged thumbnails are provided to the media player, which renders the images to indicate different portions of the video stream as the viewer scans or performs other functions. When the viewer selects to skip to a different part of the video stream, the PTS or similar identifier associated with the presented thumbnail image is sent to the placeshifting encoder to identify the appropriate starting point to resume live encoding.

In one example, a computer-implemented automatic process is executable by a media player device that presents a placeshifted stream of media content to a viewer. The process suitably comprises: receiving and storing a plurality of thumbnail images by the media player device, wherein each of the thumbnail images is a still image that is created from a video frame of a source media stream that is live encoded to create the placeshifted stream of media content, and wherein each of the thumbnail images is associated with an identifier that indicates the video frame of the source media stream used to create the thumbnail image; receiving the placeshifted stream of media content via a network from a remotely-located placeshifting device that live encodes the placeshifted stream during viewing of the media content by the viewer; rendering the placeshifted stream of media content for presentation to the viewer, wherein the media content is presented to the viewer with a time shift buffer that indicates time in the presentation of the media content; in response to an action by the viewer indicating a time in the presentation of the media content using the time shift buffer, rendering one of the thumbnail images corresponding to the indicated time; and in response to a further action by the viewer to select the indicated time of the rendered thumbnail image, the media player device providing an instruction to the remotely-located placeshifting device to perform subsequent live encoding of the placeshifted stream beginning at the video frame corresponding to the identifier of the rendered thumbnail image.

Other examples provide a computer-implemented automatic process executable by a placeshifting device that provides a placeshifted stream of media content to a remote media player device. The process suitably comprises: receiving a source stream of media content made up of a plurality of video frames, wherein the plurality of frames comprises a plurality of key frames; for at least some of the key frames in the source stream, creating an associated thumbnail image that is tagged with an identifier of the associated key frame in the source stream of media content; providing the associated thumbnail images to the remote media player device; encoding the source stream of video content to create the placeshifted stream of media content that is transmitted to the remote media device, wherein the encoding is live encoded while the remote media device presents the media content to the viewer; and in response to a command received from the remote media player device comprising the identifier of a key frame in the source stream corresponding to a thumbnail image selected by the viewer, continuing the encoding of the source stream beginning at the key frame associated with the identifier received from the remote media player device.

Still other embodiments provide a placeshifting device comprising: a receiver interface configured to receive a source stream of media content made up of a plurality of video frames including a plurality of key frames; a placeshifting encoder configured to live-encode the source stream to provide a placeshifted media stream to a remote media player device while the remote media device presents the media content to the viewer; and a controller configured to create, for at least some of the key frames in the source stream, an associated thumbnail image that is tagged with an identifier of the associated key frame in the source stream and to provide the associated thumbnail images to the remote media player device to thereby permit the remote media player device to present the thumbnail images to the viewer to indicate different times during the presentation of the media content. The controller is further configured to respond to a command received from the remote media player device comprising the identifier of a key frame in the source stream corresponding to a thumbnail image selected by the viewer to continue the encoding of the source stream beginning at the key frame associated with the received identifier.

These and other examples, aspects and other features are described in more detail below.

BRIEF DESCRIPTION OF THE DRAWING FIGURES

Figure 2:
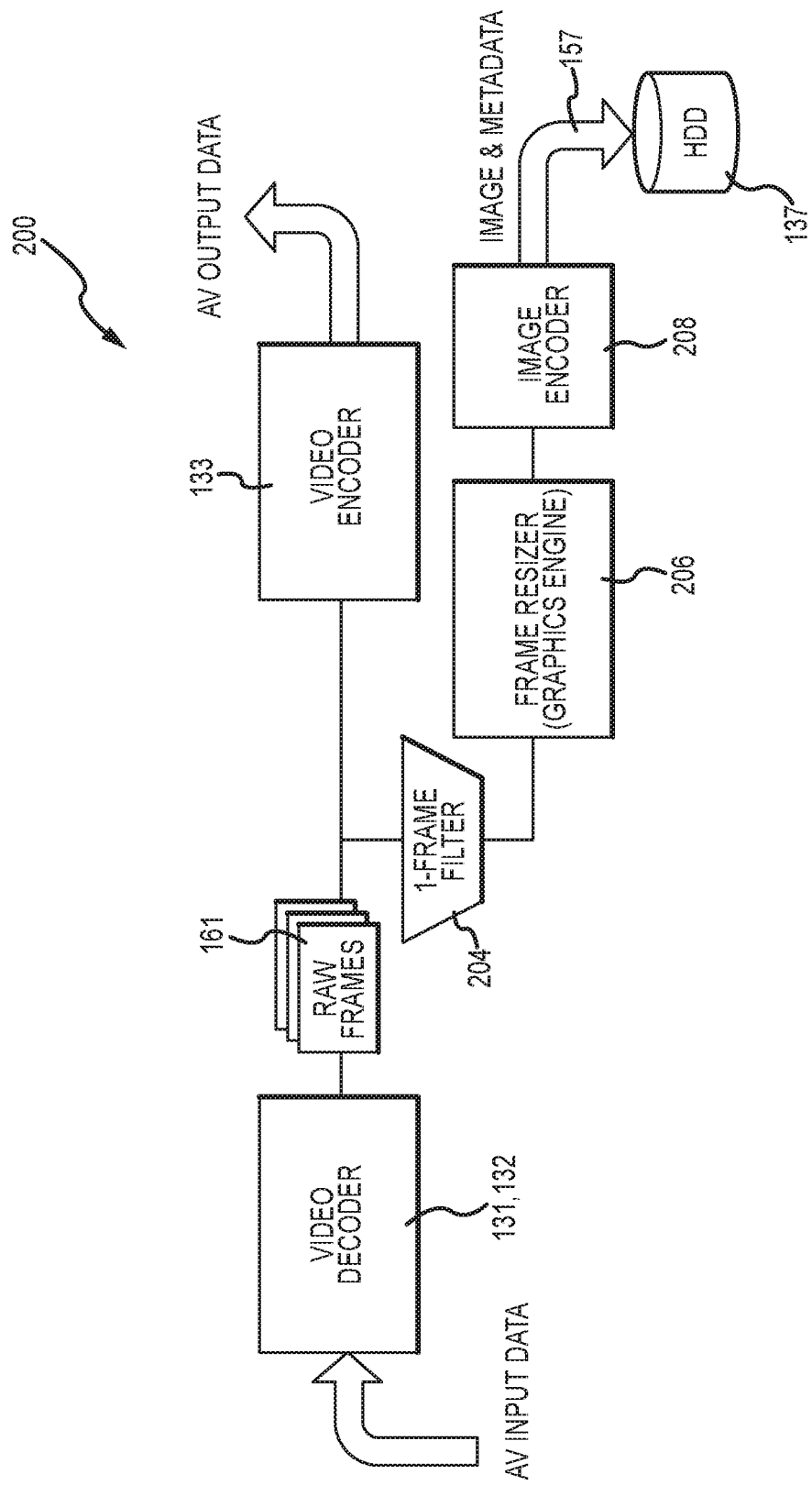
Figure 3:
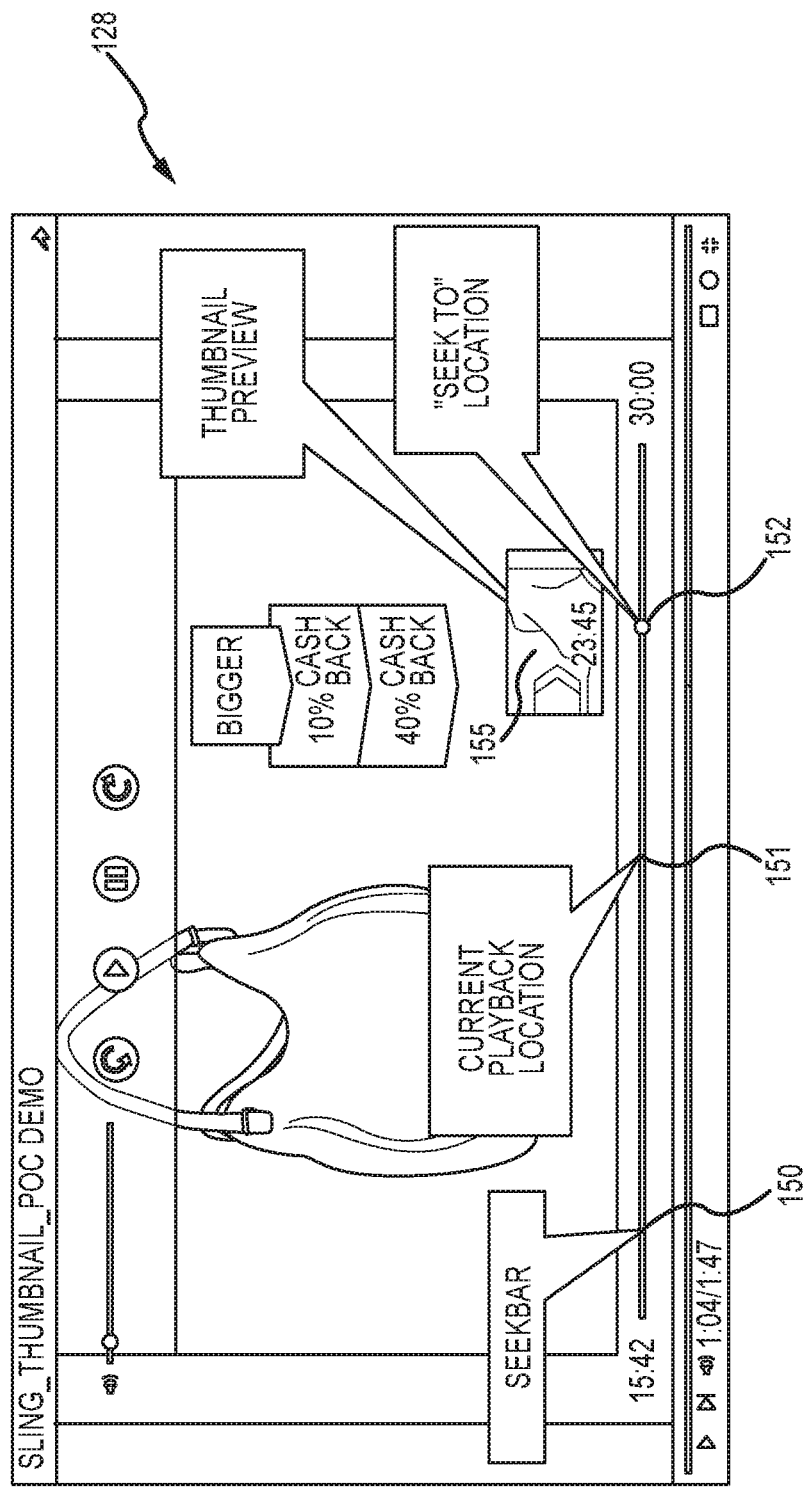

Example embodiments will hereinafter be described in conjunction with the following drawing figures, wherein like numerals denote like elements, and:

FIG. 1 is a diagram of an example placeshifting system;
FIG. 2 is a block diagram of an example encoding process; and
FIG. 3 is an example of a screen display that includes thumbnail images in a placeshifted video stream.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

Various embodiments are able to improve seeking for placeshifted or other live encoded video streams by providing a set of "thumbnail" images corresponding to the encoded intra-frames ("I-frames") of the encoded video as soon as such images become available. These images are received and stored by the playback device so they can be presented when the user activates the time shift buffer or other scanning interface. Generally speaking, the images can be presented to represent different times (e.g., presentation time stamp (PTS) times) of the encoded stream. Further, video playback after the seek operation should directly align with the preview shown in the thumbnail because the thumbnail image directly corresponds to an encoded I-frame, as described more fully below. This allows much more precise seeking for content represented by the time shift buffer, and greatly improves the placeshifting experience for the user.

Turning now to the drawings and with initial reference to FIG. 1, an example system 100 provides a placeshifted media stream 106 from a placeshifting device 104 to a client media device 102 over a network 110. Typically, the media device 102 provides content from the stream 106 as an output 125 to display 130. Display 130 then uses this output 125 to generate imagery 128 for presentation to the user, as appropriate. If the user of media device 102 provides inputs to change the media presentation on display 130, media device 102 suitably changes output 125 in response to the user inputs so that decoded content from secondary stream 107 replaces the primary content in imagery 128.

If a user wishes to scan ahead or backward in the media presentation, he or she manipulates a slider or similar feature 152 to scan forward or back in a time shift buffer 150 to move the point of presentation. As shown in FIG. 1, various embodiments are able to display thumbnail images 155 corresponding to the content at different points of time as the user manipulates the slider 152, even for live-encoded media streams. Other embodiments may use very different interfaces, as desired, to implement the thumbnails 155 and other features described herein.

In a conventional placeshifting session, placeshifting device 104 receives an analog or digital content stream 161 from one or more television receivers, video recorders and/or other content sources 131-132. The placeshifting device 104 encodes (or transcodes) the received content into a format that is compatible with network no, and transmits the encoded stream 106 over network no to a suitable media player or other media device 102. The media device 102 is then able to receive, decode and render the received stream 106 as an output 125 to a display 130, as desired. Examples of general placeshifting systems and concepts are described in U.S. Pat. No. 7,707,614, although any number of other placeshifting system and techniques could be equivalently applied in other embodiments.

In various embodiments, the placeshifting device 104 forwards certain video frames (e.g., the intra-frames or "I-frames" of an MPEG stream) 157 of the placeshifted stream 106 to the media player 102 at an early time in the encoding process so that the frames can be used as "thumbnail" images to assist in fast forward, rewind or other "trick play" features. To that end, I-frames or other key frames of the raw video 161 can be identified as soon as they are available. These frames can be quickly encoded as still frames and tagged with presentation time stamp (PTS) or similar timing information to facilitate subsequent access to that frame of the video stream. Images 157 may be encoded at relatively low quality, if desired, to facilitate fast processing and low bandwidth consumption. These images can then be rapidly sent to the media player 102, which can produce the encoded images as "thumbnail" images 155 to facilitate trick play using a time shift buffer 150 or the like.

In some embodiments, the still images 157 can be encoded on an a priori basis for stored content (e.g., files stored on a DVR or the like) so that the images 157 can be quickly delivered to the media player 102 when the program stream is initiated by a viewer. For placeshifted streams of live content (e.g., live sports or news broadcasts), the key images can be separately encoded and delivered as soon as they are available to facilitate trick play within whatever content is available.

The placeshifting device 104 shown in FIG. 1 is any device, component or module capable of receiving media content from one or more content sources 131, 132 and of encoding the content for transmission on network 110. Generally speaking, a placeshifting device 104 receives content that would traditionally be presented on a television or other display at the same location as the placeshifting device 104, but that is instead encoded and provided as streaming content 106 to a remote media device 102 via a local or wide area network 110.

Placeshifting devices 104 typically include processing hardware, memory or other storage, and input/output interfaces commonly found on consumer electronics devices. Examples of placeshifting devices 104 that could be used in various embodiments may include any of the various hardware devices that are commercially available, such as any of the various SLINGBOX products available from Sling Media of Foster City, Calif. or any number of other sources. Other types of placeshifting devices 104 could include general purpose computers, servers or the like executing placeshifting software applications. In some embodiments, placeshifting device 104 may be implemented virtually (e.g., using any number of server instances provided by a "cloud" service, a physical server system, and/or any other networked service). Still other placeshifting devices 104 could include hybrid devices such as set top boxes (STBs), television receivers, media players, digital video recorders (DVRs) and/or the like that integrate placeshifting features. One example of a hybrid product could be similar to the HOPPER 3.0 models of set top boxes available from Dish Network of Englewood, Colo., which integrates satellite and terrestrial broadcast receivers with digital video recorder (DVR) and placeshifting features. The particular commercial products referenced herein are intended solely as illustrative examples; other placeshifting products available from any number of other sources and manufacturers could be equivalently used.

The example placeshifting device 104 shown in FIG. 1 includes a processor/controller 105, one or more content sources 131-132, and one or more encoders 133. In the example shown in FIG. 1, controller 105 is any sort of microprocessor, microcontroller, digital signal processor or other programmable hardware capable of directing the actions and processes of device 104. In various embodiments, device 104 is based upon a "system on chip" (SoC) implementation that incorporates a microcontroller with memory, input/output and other features to perform the various signal processing and other actions of device 104. Various SoC and other integrated hardware implementations are available from Texas Instruments, Conexant Systems, Broadcom Inc., NXP/Qualcomm and many other suppliers as appropriate. Other embodiments may implement controller 105 and/or the other features of device 104 with any number of discrete and/or integrated processing components (e.g., any sort of microprocessor or microcontroller), memories, input/output features and/or other features as desired.

Still other embodiments may implement device 104 using a general purpose computer system that executes software to perform the various functions described herein. In the example of FIG. 1, a software module 136 is stored in memory and executed by controller 105 to direct the processing of thumbnail images described herein. Thumbnail images may be stored at least temporarily in storage 137 (e.g., disk or solid state storage) prior to transmission of the images to the client device 102, as desired.

Placeshifting device 104 obtains programming content from any number of internal or external program sources 131-132. Each program source 131-132 may represent, for example, a television receiver (e.g., a direct broadcast satellite (DBS), cable or terrestrial broadcast receiver), a digital video recorder (DVR), a media player, a network server, and/or any other source of media programming. In various embodiments, the two program sources 131-132 shown in FIG. 1 represent two separate television tuners that are each capable of separately receiving and decoding broadcast content from a DBS, cable and/or terrestrial source. Alternately, either or both program sources 131-132 may receive programming from a DVR, a video-on-demand (VOD) or other network server, an over-the-top (OTT) network television service, and/or any other source of programming content.

Each program source 131-132 is typically controllable to tune to a desired channel, or to select desired programming in any manner. Program sources 131-132 may be integrated within the same chassis as placeshifting device 104, as in a STB that integrates television receivers, DVR capabilities, placeshifting capabilities, network communication and/or the like into a common appliance. Alternately, one or more program sources 131-132 may be external tuners, DVRs, STBs, media players or other components that provide content under the control of placeshifting device 104, as desired. In such embodiments, placeshifting device 104 typically provides radio frequency (RF), infrared (IR) or other commands that can be interpreted by the controlled program source 131-132 so that desired media programming can be provided from program source 131-132 to placeshifting device 104.

Content received from any internal or external program sources 131-132 is encoded as appropriate for transmission over network no to media device 102. Content streams 106, 107 may be encoded in any format such as Windows Media, Quicktime, Flash Media, MPEG, HTML5, Apple HTTP streaming and/or any other proprietary or non-proprietary formats as desired, including any sort of adaptive streaming formats. Encoding may be provided by dedicated hardware (e.g., a dedicated encoder chip), by a dedicated encoder that is part of an SoC chip, by software executing on a general purpose processor, and/or in any other manner. In the example embodiment shown in FIG. 1, encoder 133 selectively encodes content from any of the available programming sources 131-132. Other embodiments may use other types of encoding hardware, software and/or other logic, as desired, to implement any number of parallel encoders 133.

Placeshifting device 104 operates by responding to commands received from a remotely-located media device 102 via network no to thereby provide a an encoded program stream 106, as desired. The encoded stream 106 typically provides the content that is selected by the user for placeshifted viewing on display 130. Frequently, the encoded stream 106 is live encoded in real time as the content is received from the source 131-132. If the content is prerecorded or otherwise buffered, it may be possible to encode the content faster than real-time, as described below. For live broadcasts (e.g., live sporting events), however, it may be necessary to encode the content as quickly as possible to allow the viewer to receive and enjoy the encoded content in real time (or in as close to real time as possible) while the live broadcast is occurring. In many embodiments, parameters of the live encoding are changed in real time during streaming to adapt to then-current network conditions. The bit rate, frame rate, resolution and/or other parameters may be modified as desired to create lower bandwidth a stream 106 (albeit at lower quality) when network conditions warrant. Conversely, when bandwidth is available, the encoding parameters can be increased to provide better quality video streams as conditions warrant. These changes in quality can occur in real time during the live encode to rapidly adapt to changing network conditions, as desired.

Network 110 may encompass any number of digital or other communications networks that allow multiple nodes (e.g., devices 102, 104) to communicate with each other using any common protocols, signaling schemes and/or the like. In various embodiments, network no encompasses one or more wired or wireless local area networks (LANs), wide area networks (WANs), and/or the like. Network no may also encompass the Internet, any cellular or other telephone network, and/or any other pubic or private networks as desired.

Media device 102 (also referenced herein as "media device 102") is any device, component, program or the like that is capable of receiving placeshifted content 106 and 107 from one or more placeshifting devices 104 via network 110. Client devices 102 may be variously implemented using any sort of portable or desktop computer systems, mobile telephones, tablet devices, media players and/or the like. In some embodiments, media device 102 may be implemented with special-purpose hardware, and/or with any other products as desired.

To that end, media device 102 typically includes any sort of processor 112 that executes software instructions, along with associated memory 113 and conventional input/output features 114 such as a network interface, an interface to mass storage, an interface to display 130, interfaces to user input devices, and/or the like. In the embodiment shown in FIG. 1, media device 102 executes a placeshifting software application 120 that directs the various hardware features of media device 102 to perform the functions and to provide the features described herein. Application 120 typically interfaces with processor 112, memory 113 and input/output features 114 via any conventional operating system 115.

As shown in FIG. 1, application 120 suitably includes control logic 126 that processes user inputs to obtain placeshifted content stream 106 from one or more remotely-located content sources 131, 132, to decode the received streams and to provide output signals 125 to a display 130 as appropriate. Control logic 126 typically establishes a control session with the remote placeshifting device 104 that allows communication with controller 135 so that placeshifted stream 106 can be established and maintained as desired.

Placeshifted media stream 106 is decoded as appropriate. In the example shown in FIG. 1, stream 106 is decoded by a decoding module 121. Decoding module 121 may be implemented using specialized hardware in some embodiments, although other embodiments will instead decode stream 106 using software executing on processor 112 or the like. Decoded programming can be provided to a presentation module 124 that generates output signals 125 as desired to generate imagery 128 for viewing by the user.

Display 130 is any television, video monitor or other display capable of presenting media imagery 128 to the user. In the example shown in FIG. 1, display 130 provides imagery 128 in response to output signals 125 generated by software application 120 as appropriate. Some types of media devices 102 may incorporate a built-in display 130, such as the display in a laptop or other portable computer, a media player, a mobile phone, tablet and/or the like. In such embodiments, signals 125 are provided using a conventional video display interface or the like to generate imagery on the integrated display 130. In other embodiments wherein device 102 provides video output signals 125 to an external television or other display 130, such outputs 125 may be provided in any compatible format from any conventional display interface, such as component video, S-video, High-Definition Multimedia Interface (HDMI), Digital Visual Interface (DVI), IEEE 1394, and/or any other formats as desired.

In operation, control logic 126 suitably obtains programming in response to user inputs received at input/output features 114 of media device 102. Control logic 126 typically establishes a control connection with the remote placeshifting device 104 via network no so that commands can be provided from control logic to controller 135. Controller 135 responsively controls program source 131 and/or source 132 to obtain the selected programming. The obtained programming is encoded (using encoder 133) at an appropriate resolution, bit rate, frame rate or other quality parameters to generate stream 106. This stream 106 is transmitted from placeshifting device 104 to media device 102 via network 110, decoded, and provided as an output 125 to display 130 using conventional placeshifting techniques.

As noted above, placeshifted video streams are typically "live encoded" while the viewer is watching the stream. One advantage of placeshifting is that parameters of the live encode (e.g., bit rate, frame rate, resolution, etc.) can be typically adjusted in real time (recognizing that some delay is inherent due to processing, network transport and the like) to adapt to then-current conditions and capabilities of network 110, media device 120, and/or other factors as appropriate. That is, placeshifting can adapt the quality of the video and/or the bandwidth consumed by the video to provide the best possible user experience under then-current conditions.

The placeshifted stream is typically compressed in comparison to the raw video stream 161 received from the video source 131, 132, 137 to preserve bandwidth on the network 110. One way to compress the placeshifted stream is to reduce the frame rate of the encoded video so that the same underlying content is represented with fewer video frames. Within placeshifting device 104, the placeshifted stream 106 typically has different properties than the received streams 161. Placeshifted stream 106 may use a different codec or encoding format, for example. Stream 106 may additionally or alternately exhibit a different frame rate, bit rate, resolution, group-of-pictures (GOP) distance (e.g., the distance between I-frames), and/or the like.

When the user of device 102 commands a seek (e.g., trick play) function to change the point of playback, media player 102 directs the encoder 133 to encode content in stream 161 from a new starting point. In various embodiments, the media player 102 provides the previously-received still images 157 as thumbnails 150 so that the viewer can identify the desire point in the buffer 150 to resume playback of stream 106. After the viewer selects the desired playback point, the PTS or other time stamp of the previously-supplied image can be supplied to the encoder 133 to identify the place in stream 161 to resume encoding. If the frames 157 are extracted from input streams 161 and are associated with PTS or other timing data from the input stream 161, then that same timing data can be used at a later time to identify places in the input stream 161 to resume encoding.

By generating thumbnails 155 from the I-frames of the input video 161, the video playback after the seek operation can conveniently align with the thumbnail preview. A typical MPEG video stream incorporates intra-frames (I-frames) that contain complete image data, as well as inter-frames such as predictive (P-frames) and backward predictive (B-frames) representing changes from previous or subsequent frames, respectively. In practice, encoding almost always begins on an I-frame because only these frames have the complete image data. By using the I-frames as thumbnail representations in the placeshifted stream, an additional advantage can be obtained because the particular frame needed to resume encoding (e.g., the I-frame) is already identified within the stream. This can provide improved responsiveness over other techniques that rely upon clock time to identify playback points. That is, providing a convenient reference to the I-frame eliminates the need to separately search out an appropriate I-frame that is near a commanded playback time, as required in many prior implementations. The pre-identification of key frames is a particular benefit in placeshifting applications due to the challenges in making real-time encoding as responsive to user commands as possible.

FIG. 2 shows a block diagram of an example process 200 for encoding thumbnail images 157. Process 200 may be implemented using module 136 executing in controller 135 of placeshifting device 104, or in any other processing circuitry or other logic as desired. In various embodiments, the various functions shown in FIG. 2 may be performed by different hardware processors acting in concert, including any sort of cloud-based hardware or hardware executing on a separate device, as desired.

As noted above, a video decoder 131, 132 suitably converts received broadcast, streaming or other content into raw video 161. The raw video 161 may be stored on a DVR or the like (e.g., storage 137) for time shifted playback. Additionally or alternately, the raw video 161 may be live encoded by a video encoder 133 for placeshifted viewing of the received content. As noted above, video content may be both time and place shifted, as desired. In such cases, raw video 161 is typically stored in a DVR or the like until the viewer requests placeshifted playback. At that time, the previously-stored raw video 161 is retrieved from storage and live-encoded by encoder 133 to create the placeshifted video stream 106.

Whenever the raw frames 161 become available, some or all of the key frames (e.g., I-frames) may be identified and readily converted to appropriate thumbnail images 157. In the example of FIG. 2, I-frames in the raw video 161 are identified by a filter module 204 and resized or otherwise compressed as desired by a graphics engine 206. Typically, the thumbnail images 157 are relatively small in size so as not to obscure the underlying imagery 128 during playback of the video. Shrinking the size of the images also reduces the bandwidth necessary to transfer and process the images, thereby potentially improving performance as well.

The identified frames of the raw video 106 are converted to still images 157 as desired. In the example of FIG. 2, an image encoder 208 converts the resized video frame to an appropriate JPEG, PNG, TIFF, GIF, MPEG or other still image format. The converted images are tagged or otherwise associated with timing information (e.g., PTS or similar time stamps from the original raw data stream 106) and stored in storage 137 for subsequent processing. As noted above, images 157 may be transferred immediately to the player device 102 to facilitate convenient browsing of the placeshifted video stream 106, even for live broadcast content. Other embodiments could store images 157 in any location and/or transfer images 157 to the remote device 102 at any time prior or during playback of stream 106.

To that end, images 157 may be live encoded and immediately sent to the remote device 102 to facilitate backward skipping or rewind of live television content. Other embodiments could store imagery 157 in storage 137 or elsewhere for later delivery, as desired. Images 157 may be stored with the raw content 106 in a DVR, for example, so that the images 157 are available for immediate delivery to the remote player device 102 when the associated program from the DVR is requested for placeshifted viewing.

In some implementations, the video player 102 is able to "synchronize" with a DVR or similar device so that the images 157 associated with programming available from the DVR are transferred at a convenient time (e.g., when the DVR and media player 102 are both operating on the same local area network, or at a time when either device and/or the network is relatively idle) so that images are already stored on the media device 102 when the viewer commands playback of a program that is remotely stored on the DVR. Other embodiments could equivalently cache the images 157 with a cloud-based or other server operating on network no to facilitate retrieval by the media player 102 via faster network connections, as desired. Network storage of images 157 could also reduce the storage demands on storage 137, as appropriate. Many other timing and storage arrangements could be formulated across a wide array of equivalent embodiments, as desired.

As noted above, thumbnail images 157 are typically tagged or otherwise associated with metadata that describes the PTS of the source I-frame, or other timing information as appropriate to allow for convenient identification of the frame during future viewing/encoding. In various embodiments, images 157 may also be tagged or otherwise associated with additional metadata such as image width and/or height, image aspect ratio, and/or the like. Various embodiments may provide the "clock time", or similar position of the thumbnail within the content duration, if desired. Such information may be useful, for example, in case of any PTS rollover or the like. Clock timing information may also be helpful in arranging the presentation of thumbnail images at various parts of the time shift buffer 150 by the client 102, although other embodiments may simply arrange the various thumbnails sequentially based upon the PTS or similar timing data.

Tagging or other associating of metadata may be performed in any manner. Various embodiments may make use of XML, extensible metadata platform (XMP), extended file attributes and/or any other tagging techniques or structures to store the metadata associated with the various images 157, as desired.

Client device 102 obtains thumbnail images 157 in any manner. As previously noted, images 157 obtained by the client 102 can stored on the client device 102 for subsequent display to the user during fast forward, rewind, seek and/or similar operations so that the user can visualize the exact point in the content that will be skipped to. Because each thumbnail has associated metadata corresponding to the PTS of its source frame in the raw content 161, it is relatively straightforward to identify the first desired frame in the raw data 106 during a seek or other trick play operation. When the user sees the relevant thumbnail image and commits to the seek operation, a seek request can be sent to the placeshifting device 104 that identifies the PTS or similar timing information from the metadata of the selected image. If thumbnail images 157 were generated to correspond to the I-frames of the input video 106, the PTS of the selected image 157 will always correspond to an I-frame, thereby allowing subsequent video decoding to proceed from this exact frame.

FIG. 3 provides one example of imagery 128 produced by client media player device 102. As shown in FIG. 3, output imagery 128 includes a seek bar that indicates a time shift buffer 150 representing the advancement of time during the video presentation. In this example, the current playback position 151 is indicated, and the viewer is able to point or otherwise select a different point of interest 152 (shown in the figure as a "seek to" location). In various embodiments, the media player device 102 renders a thumbnail image 155 to show a picture of the media presentation at the indicated time. The particular thumbnail image 157 that is selected for presentation as image 155 may be determined from the sequential order of the PTS or similar identifiers contained in the image metadata, according to "clock time" data contained in image metadata, or according to other factors as desired.

When the viewer selects a time in the buffer 150 that is indicated by a thumbnail image 155, the media player 102 is able to readily identify the position in the original source stream 106 according to the PTS or similar identifier in the metadata of the displayed thumbnail 155. The media player 102 therefore sends a message via network 110 or otherwise directs the placeshifting device 104 to perform subsequent encoding/transcoding from the frame of the source stream 106 that is indicated in the metadata of the displayed thumbnail 155. As noted above, the particular interface shown in FIG. 3 is one illustrative example. Any number of alternate but equivalent embodiments could be formulated using other constructs or modes of operation, as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A computer-implemented automatic process executable by a placeshifting device that provides a placeshifted stream of media content over a network to a remote media player device, the process comprising:
   receiving a source stream of media content made up of a plurality of video frames by the placeshifting device, wherein the plurality of frames comprises a plurality of key frames, and wherein the source stream is a digital stream of media content;
   for at least some of the key frames in the source stream, the placeshifting device creating an associated digital thumbnail image that is tagged with a digital identifier of the associated key frame in the source stream of media content;
   storing the digital thumbnail images tagged with digital identifiers of the associated key frames as metadata for the media content;
   after receiving a subsequent request for the media content from the remote media player device via the network, the placeshifting device initially providing the metadata comprising each of the associated thumbnail images and their associated digital identifiers to the remote media player device via the network;
   after providing the metadata to the remote media player device, the placeshifting device beginning a live encoding of the source stream of video content to create the placeshifted stream of media content that is transmitted to the remote media device, wherein the encoding is live encoded while the viewer is viewing the media content from the remote media player device; and
   in response to a message received from the remote media player device via the network that comprises the identifier of a key frame in the source stream corresponding to a thumbnail image selected by the viewer, the placeshifting device discontinuing the live encoding of the placeshifted media stream at the prior playback location and skipping to continue the live encoding of the source stream beginning at the key frame associated with the identifier received from the remote media player device so that the playback of the placeshifted media stream by the media player device skips to the key frame corresponding to the thumbnail image selected by the viewer.

2. The process of claim 1 wherein the thumbnail images are created and provided to the remote media player device prior to the encoding of the placeshifted media stream.

3. The process of claim 1 wherein the source stream is recorded on a digital video recorder, and wherein the thumbnail images are created upon storage of the source stream in the digital video recorder, and wherein the thumbnail images are provided to the remote media player device prior to the encoding of the placeshifted media stream.

4. The process of claim 1 wherein the source stream is recorded on a digital video recorder, and wherein the thumbnail images are created upon storage of the source stream in the digital video recorder, and wherein the thumbnail images are stored on the digital video recorder until placeshifting of the source stream is requested by the remote media player device.

5. The process of claim 1 wherein the source stream represents a live television broadcast received from a television tuner, and wherein the thumbnail images are created and provided to the remote media player device during placeshifting of the live television broadcast.

6. The process of claim 1 wherein the key frames of the source stream are I-frames, and wherein the identifiers are presentation time stamps of the associated I-frames.

7. A placeshifting device comprising:
   a receiver interface configured to receive a source stream of media content made up of a plurality of video frames including a plurality of key frames;
   a placeshifting encoder configured to live-encode the source stream to provide a placeshifted media stream to a remote media player device while the remote media device presents the media content to the viewer; and
   a controller configured to create, for at least some of the key frames in the source stream, an associated thumbnail image that is tagged with a digital identifier of the associated key frame in the source stream and to store the thumbnail images tagged with digital identifiers of the associated key frames as metadata representing the media content, wherein the controller is further configured to respond to a subsequent request for the media content from the remote media player device via the network by initially providing the metadata comprising each of the associated thumbnail images to the remote media player device and initiating the live encoding of the source stream by the placeshifting encoder to thereby permit the remote media player device to present the thumbnail images to the viewer to indicate different times during the presentation of the media content, and wherein the controller is further configured to respond to a message received from the remote media player device via the network comprising the digital identifier of a thumbnail image selected by the viewer to skip the encoding of the source stream to discontinue the live encoding at the prior playback location and instead begin live encoding of the placeshifted media stream at a key frame that is associated with the received digital identifier so that playback of the placeshifted media stream by the media player device skips to the key frame associated with the received digital identifier.

8. The placeshifting device of claim 7 further comprising a digital video recorder, wherein the source stream is initially recorded on the digital video recorder, wherein the thumbnail images are created upon storage of the source stream in the digital video recorder, and wherein the thumbnail images are provided to the remote media player device prior to the encoding of the placeshifted media stream.

9. The placeshifting device of claim 7 further comprising a digital video recorder, wherein the source stream is initially recorded on the digital video recorder, wherein the thumbnail images are created upon storage of the source stream in the digital video recorder, and wherein the thumbnail images are stored on the digital video recorder until placeshifting of the source stream is requested by the remote media player device.

10. The placeshifting device of claim 7 wherein receiver interface is a television tuner, and wherein the source stream represents a live television broadcast received from the television tuner, and wherein the thumbnail images are created and provided to the remote media player device during placeshifting of the live television broadcast.

11. The placeshifting device of claim 7 wherein the key frames of the source stream are I-frames, and wherein the identifiers are presentation time stamps of the associated I-frames.

* * * * *